(12) United States Patent
Kim et al.

(10) Patent No.: US 12,000,475 B2
(45) Date of Patent: Jun. 4, 2024

(54) APPARATUS AND METHOD FOR CONTROLLING DRIVING OF VEHICLE

(71) Applicant: SL Corporation, Daegu (KR)

(72) Inventors: Jiyoung Kim, Gyeongsan-si (KR); Mihyang Park, Gyeongsan-si (KR); Yongwoo Park, Gyeongsan-si (KR); Jeongho Park, Gyeongsan-si (KR); Byungki Ji, Gyeongsan-si (KR); Gaeun Lee, Gyeongsan-si (KR)

(73) Assignee: SL Corporation, Daegu (KR)

( * ) Notice: Subject to any disclaimer, the term of this patent is extended or adjusted under 35 U.S.C. 154(b) by 5 days.

(21) Appl. No.: 17/976,729

(22) Filed: Oct. 28, 2022

(65) Prior Publication Data

US 2023/0160467 A1 May 25, 2023

(30) Foreign Application Priority Data

Nov. 19, 2021 (KR) .................. 10-2021-0160615

(51) Int. Cl.
| | |
|---|---|
| *F16H 59/02* | (2006.01) |
| *B60Q 3/283* | (2017.01) |
| *F16H 59/08* | (2006.01) |
| *F16H 59/74* | (2006.01) |
| *G05G 1/01* | (2008.04) |
| *G05G 5/00* | (2006.01) |
| *B60K 20/02* | (2006.01) |

(52) U.S. Cl.
CPC ......... *F16H 59/0217* (2013.01); *B60Q 3/283* (2017.02); *F16H 59/08* (2013.01); *F16H 59/74* (2013.01); *G05G 1/01* (2013.01); *G05G 5/005* (2013.01); *B60K 20/02* (2013.01); *F16H 2059/081* (2013.01); *F16H 2059/746* (2013.01)

(58) Field of Classification Search
CPC ....... F16H 2061/2884; F16H 2059/746; F16H 61/32; F16H 59/08; F16H 2059/0291; F16H 2061/326; B60Q 3/70
See application file for complete search history.

(56) References Cited

U.S. PATENT DOCUMENTS 9,303,755 B2 * 4/2016 Kim ................. F16H 59/10
10,731,750 B2 * 8/2020 Wang ............... F16H 61/22

FOREIGN PATENT DOCUMENTS

KR 20120001949 A * 1/2012

OTHER PUBLICATIONS

Bimmerfest (Jul. 15, 2007) (Year: 2007).*
Honda Owner's Manual 2017 (Year: 2017).*
Motor Control Tips (Jan. 11, 2017) (Year: 2017).*

* cited by examiner

*Primary Examiner* — Gregory Robert Weber
(74) *Attorney, Agent, or Firm* — United One Law Group LLC; Kongsik Kim; Jhongwoo Peck (57) ABSTRACT

An apparatus for controlling a vehicle includes a vehicle state detector for detecting a vehicle state, a function unit that performs at least one vehicle function, an operation unit that enables a transmission operation to allow selection of a transmission stage from among a plurality of transmission stages, and a position adjusting unit to switch the operation unit between a first position where the transmission operation is disabled and a second position where the transmission operation is enabled, by rotating the operation unit with respect to the functional unit, based on the detected vehicle state.

14 Claims, 10 Drawing Sheets

APPARATUS AND METHOD FOR CONTROLLING DRIVING OF VEHICLE

CROSS-REFERENCE TO RELATED APPLICATION(S)

This application claims priority from Korean Patent Application No. 10-2021-0160615, filed on Nov. 19, 2021, which is incorporated herein by reference in its entirety.

BACKGROUND

1 Technical Field

The present disclosure relates to an apparatus for controlling driving of a vehicle and an operating method thereof, and more particularly, to an apparatus for controlling driving of a vehicle capable of allowing a driver to more easily recognize a vehicle state, and an operating method thereof.

2. Description of the Related Art

A transmission device may adjust a gear ratio to keep the engine at a particular rotational speed based on the speed of the vehicle, and the driver operates the transmission lever to change the gear ratio of the transmission.

As the transmission mode of the transmission device, there are a manual transmission mode, in which the driver can manually shift transmission stages, and an automatic transmission mode, in which a gear ratio is automatically shifted based on the vehicle speed when the driver selects the drive (D) stage.

In addition, a sports mode capable of performing manual transmission and automatic transmission in one transmission device is also being used. Since a transmission device capable of manual transmission is provided in addition to a transmission device that performs automatic transmission, the sports mode primarily performs automatic transmission while allowing the driver to perform manual transmission of increasing or decreasing the gear stages.

In this case, the transmission lever simply serves to allow the driver to select a transmission stage, and a method for providing more diverse information via the transmission lever is required.

SUMMARY

The present disclosure has been devised to solve the above problems, and the technical object of the present disclosure is to provide an apparatus and method for controlling the driving of a vehicle capable of adjusting the position of an operation unit that enables the transmission operation with respect to a function unit for performing at least one vehicle function based on the vehicle state so that the driver can more easily recognize the current state of the vehicle.

The objects of the present disclosure are not limited to the ones mentioned above, and other objects will be clearly understood by those skilled in the art from the following description.

According to an aspect of the present disclosure, an apparatus for controlling driving of a vehicle may include a vehicle state detector that detects a vehicle state, the vehicle state including a first state which indicates that an ignition of the vehicle is off, and a second state which indicates that the ignition of the vehicle is on; a function unit that performs at least one vehicle function; an operation unit that enables a transmission operation to allow a transmission stage to be selected from among a plurality of transmission stages; and a position adjusting unit that switches the operation unit between a first position where the transmission operation is disabled and a second position where the transmission operation is enabled, by rotating the operation unit with respect to the functional unit, based on the detected vehicle state.

The first state may include a state in which an engine of an internal combustion engine vehicle is not running or a state in which an electric vehicle is not drivable, and the second state may include a state in which the engine of the internal combustion engine vehicle is running or a state in which the electric vehicle is drivable. The first state may also include an ignition preparation state which indicates that the ignition of the vehicle is off and the vehicle is expected to be driven.

The function unit may be activated in the first state and the second state. The function unit may perform a preset function based on the detected vehicle state. The function unit may receive a control command for controlling the at least one vehicle function, and may output a response corresponding to the input control command. The function unit may include a light emitting module for forming a lighting image having a predetermined shape, and the light emitting module may form a lighting image that performs a welcoming function in the first state, and may form a lighting image that indicates a current transmission stage in the second state. In some embodiments, at least one of the plurality of transmission stages may be selectable via the function unit.

The operation unit may include an opening that surrounds at least a portion of the function unit, and the opening may expose at least a portion of the function unit to an interior space of the vehicle when the operation unit is at the first position and the second position. The operation unit may include a transmission operation unit disposed on a first surface thereof for the transmission operation, and the position adjusting unit may adjust a position of the operation unit to allow the first surface to be exposed to an interior space of the vehicle at the second position and to be unexposed to the interior space of the vehicle at the first position. The position adjusting unit may include a driving unit, and a driving force transfer unit for transferring a driving force from the driving unit to a driving shaft coupled to the operation unit. The transmission operation unit may be operated by a dial operation method, a button operation method, a touch operation method, or any combinations thereof.

The driving shaft may be disposed to pass through the function unit to allow a position of the function unit to be maintained as the operation unit rotates.

The operation unit may include a light emitting module disposed on a second surface for forming a lighting image having a predetermined shape, and the position adjusting unit may adjust a position of the operation unit to allow the second surface to be exposed to the interior space of the vehicle at the first position and to be unexposed to the interior space of the vehicle at the second position.

A position detector may be further provided for detecting a position of the operation unit, and the position detector may include a magnet whose position is changed according to a position of the operation unit, and a sensor that detects a strength of a magnetic force generated by the magnet.

According to another aspect of the present disclosure, a method for controlling a vehicle may include detecting a vehicle state, the vehicle state including a first state which indicates that an ignition of the vehicle is off, and a second state which indicates that the ignition of the vehicle is on; and adjusting a position of an operation unit that enables a driver's transmission operation so as to be disposed between a first position, in which the transmission operation is disabled, and a second position, in which the transmission operation is enabled, by rotating the operation unit based on the detected vehicle state with respect to a function unit that performs at least one vehicle function.

The step of adjusting the position may include adjusting the position of the operation unit to allow a first surface, on which a transmission operation unit is disposed, to be exposed to an interior space of the vehicle in the second state, and to be unexposed to the interior space of the vehicle in the first state. The step of adjusting the position may include adjusting the position of the operation unit to allow a second surface, on which the function unit is disposed, to be exposed to the interior space of the vehicle in the first state, and to be unexposed to the interior space of the vehicle in the second state.

In some embodiments, forming a lighting image having a predetermined shape using a light emitting module provided in the function unit depending on whether the operation unit is disposed at the first position or the second position may be further included. For example, a lighting image that performs a welcoming function may be formed using the light emitting module in the first state, and a lighting image that indicates a current transmission stage may be formed in the second state.

According to the vehicle transmission device and operating method of the present disclosure as described herein, there are one or more of the following effects. Since the position of the operation unit that enables the transmission operation may be adjusted with respect to the function unit depending on the vehicle state, the driver can more easily recognize the vehicle state, thereby improving the driver's convenience and safety. Effects of the present disclosure are not limited to the ones mentioned above, and other effects will be clearly understood by those skilled in the art from the description of the claims.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of idealized embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the drawings for describing the driving control apparatus of a vehicle and method of controlling a vehicle according to embodiments of the present disclosure.

Figure 1:
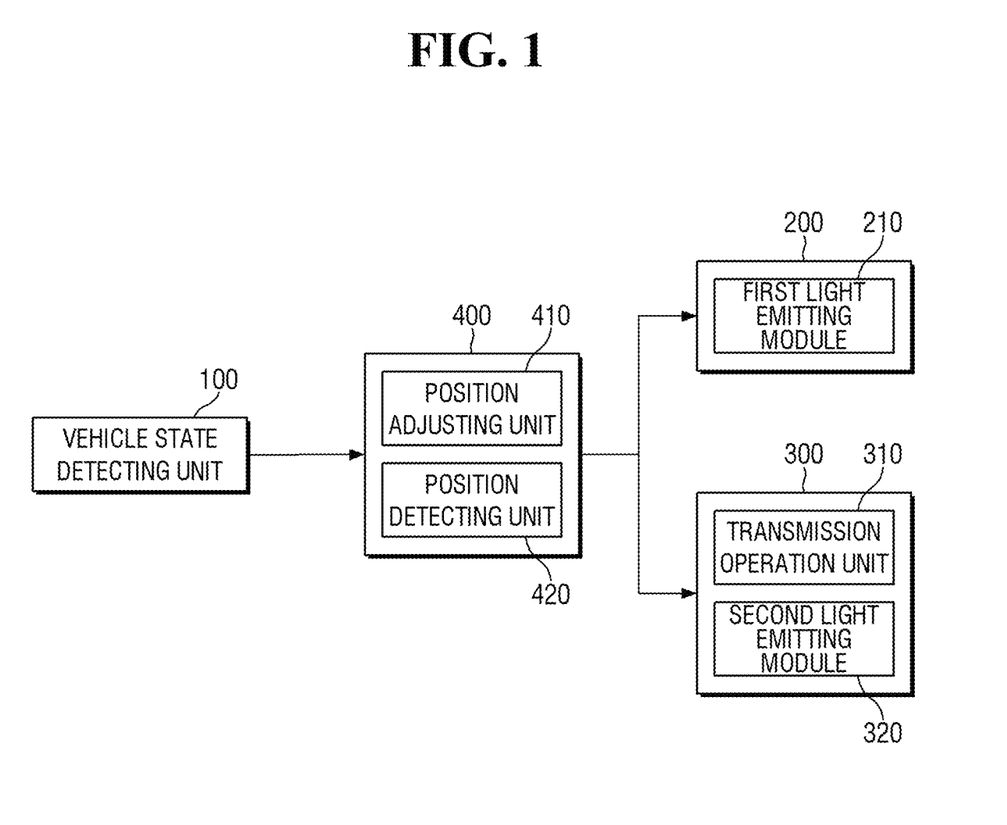
FIG. 1 is a block diagram illustrating a configuration of a driving control apparatus of a vehicle according to an embodiment of the present disclosure.

FIG. 1 is a block diagram illustrating a configuration of a driving control apparatus for a vehicle according to an exemplary embodiment of the present disclosure. Referring to FIG. 1, the driving control apparatus 1 for a vehicle according to an embodiment of the present disclosure may include a vehicle state detector 100, a function unit 200, an operation unit 300, and a control unit 400.

The vehicle state detector 100 may detect at least one vehicle state for activation of at least one of the function unit 200 or the operation unit 300, and in an embodiment of the present disclosure, an example in which the vehicle state detector 100 detects at least a first state and a second state will be described. More particularly, the first state may indicate that the ignition of the vehicle is turned off, and may also include an ignition preparation state to be described later below. The second state may indicate that the ignition of the vehicle is turned on. However, the present disclosure is not limited thereto, and the vehicle state to be detected by the vehicle state detector 100 may be included, excluded, or changed depending on vehicle states required for the activation of at least one of the operation unit 300 or the function unit 200.

The first state may be understood as a state when an engine is not operating for the case of internal combustion engine vehicles or a state when the vehicle is not drivable for the case of electric vehicles. The second state may be understood as a state when the engine is operating for the case of internal combustion engine vehicles or a state when the vehicle is drivable for the case of electric vehicles. In addition, the ignition preparation state may be understood as a state in which the driving of the vehicle is expected in the near future, such as when the vehicle's door opens, a driver with a smart key approaches the vehicle, a driver is detected within the vehicle, or the brake is applied, while the ignition of the vehicle is turned off.

The detection result of the vehicle state detector 100 may be delivered to a control unit 400 to be described later below, and the control unit 400 may be configured to activate at least one of the function unit 200 or the operation unit 300 based on the detected vehicle state.

The function unit 200 may enable the performance of at least one vehicle function, and the at least one vehicle function may not only include the vehicle's core functions performed by an electric or mechanical component of the vehicle, but may also include convenience or design functions implemented by a physical structure such as the interior of the vehicle or shape itself.

Hereinafter, in an embodiment of the present disclosure, an example in which the function unit 200 serves to perform a preset vehicle function based on the vehicle state by an electric component mounted on the vehicle, or allows the driver to input a control command for controlling at least one vehicle function will be described.

The function unit 200 may be always activated in the first state and the second state, which allows the driver to control various functions of the vehicle, for example, a door, a seat, a mirror, a window, a navigation system, an AV system, an air conditioning system, and the like, in the first state, in which the ignition of the vehicle is turned off, as well as in the second state, in which the ignition of the vehicle is turned on.

In addition, the function unit 200 may perform not only the above-described vehicle function control but also a preset function. As an example, the function unit 200 may perform a welcoming function to facilitate the communication between the vehicle and the driver by letting the vehicle react as if it welcomes the driver in the first state, and for this purpose, the function unit 200 may include a first light emitting module 210 that forms a lighting image for the welcoming function.

The function unit 200 may provide various operation methods such as a dial operation method, a touch operation method, a button operation method, a switch operation method, a joystick operation method, and the like so that the driver can input a control command for controlling the vehicle function. The function unit 200 may also output a response (e.g., a feedback) by sound or vibration in response to the control command input by the driver, so that the driver can recognize whether the control command is properly acknowledged.

Meanwhile, the first light emitting module 210 may form a lighting image that performs the welcoming function in the first state and also form a lighting image that indicates the current transmission stage selected by the driver in the second state.

The operation unit 300 may allow the driver's transmission operation while the vehicle is being driven, and the operation unit 300 may include a first position, in which the driver's transmission operation is disabled, in the first state, and may include a second position, in which the transmission operation is enabled, in the second state. The position of the operation unit 300 may be adjusted between the first position and the second position by the control unit 400 to be described later below.

The operation unit 300 may include a transmission operation unit 310 on a first surface thereof, which enables the driver's transmission operation, and when the operation unit 300 is at the second position, the first surface, on which the transmission operation unit 310 is disposed, may be exposed to the interior space (e.g., cabin) of the vehicle to allow the driver to perform the transmission operation. When the operation unit 300 is at the first position, the first surface, on which the transmission operation unit 310 is disposed, may be hidden from the interior space of the vehicle to prevent the driver's inadvertent operation. In other words, at the first position, the transmission operation unit 310 may not be visible to the driver, so that inadvertent operation can be prevented more effectively.

Accordingly, the position of the operation unit 300 may be adjusted based on the vehicle state so that the transmission operation unit 310 is exposed or unexposed to the interior space of the vehicle. For internal combustion engine vehicles, the driver may more easily recognize that the ignition of the vehicle is turned on due to the engine noise or vibration. However, for electric vehicles, it may be more difficult for the driver to recognize that the ignition of the vehicle is turned on since the electric vehicles use the driving force of the motor as the power source and there is no engine noise or vibration. Therefore, by allowing the transmission operation unit 310 to be exposed or unexposed to the interior space of the vehicle based on the vehicle state, the driver may more easily recognize whether the ignition of the vehicle is turned on in an electric vehicle as well as in an internal combustion engine vehicle.

Similar to the function unit 200, the operation unit 300 may also include a second light emitting module 320 that forms a lighting image of a predetermined shape, and the second light emitting module 320 may be exposed to the interior space of the vehicle in the first state so that a lighting image for a welcoming function may be formed similarly to the above-described first light emitting module 210.

In this case, the operation unit 300 may include the second light emitting module 320 disposed on a second surface that is different from the first surface on which the transmission operation unit 310 is disposed. When the operation unit 300 is at the first position, the second surface may be exposed to the interior space of the vehicle and the first surface may be unexposed to the interior space of the vehicle. When the operation unit 300 is at the second position, the first surface may be exposed to the interior space of the vehicle and the second surface may be unexposed to the interior space of the vehicle.

In other words, in the first state, the second surface which includes the second light emitting module 320 may be exposed to the interior space of the vehicle to allow a lighting image to be formed by both the first light emitting module 210 and the second light emitting module 320 to implement the welcoming function. In the second state, the position of the operation unit 300 may be adjusted to allow the second surface which includes the second light emitting module 320 may not be exposed to the interior space of the vehicle, and the first surface which includes the transmission operation unit 310 may be exposed to the interior space of the vehicle to allow the driver's transmission operation and to form a lighting image indicative of the current transmission stage by the first light emitting module 210. For example, the first light emitting module 210 may be configured to display a letter "D" to indicate that the drive (D) stage is currently selected.

Figure 2:
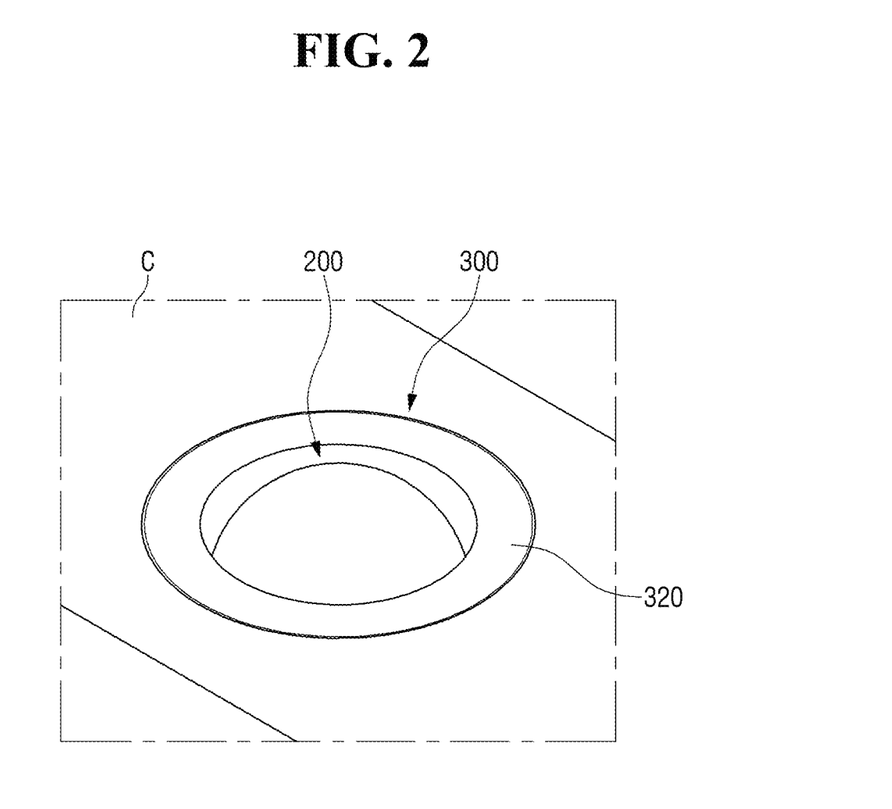
FIGS. 2 and 3 are schematic views showing the exterior of a function unit and an operation unit according to an embodiment of the present disclosure.

The case where the function unit 200 and the operation unit 300 are disposed in the center console C between the driver's seat and the passenger seat as shown in FIG. 2 is described as an example, but the present disclosure is not limited thereto. The function unit 200 and the operation unit 300 may be installed in various locations where the driver can easily access them.

FIG. 2 shows an example of the operation unit 300 in the position for the first state. In this case, the lighting image for the welcoming function may be formed collectively by the second light emitting module 320 disposed on the second surface of the operation unit 300 along with the lighting image by the first light emitting module 21.

The control unit 400 may be configured to activate at least one of the function unit 200 or the operation unit 300 based on the vehicle state. Herein, the terms "activate" or "activation" may be understood as a state where a preset function is performed by at least one of the function unit 200 or the operation unit 300 in the first state or the second state, or a state where a driver's operation for at least one of the function unit 200 or the operation unit 300 is allowed, or a state where the control command input to at least one of the function unit 200 or the operation unit 300 is determined to be valid.

Figure 3:
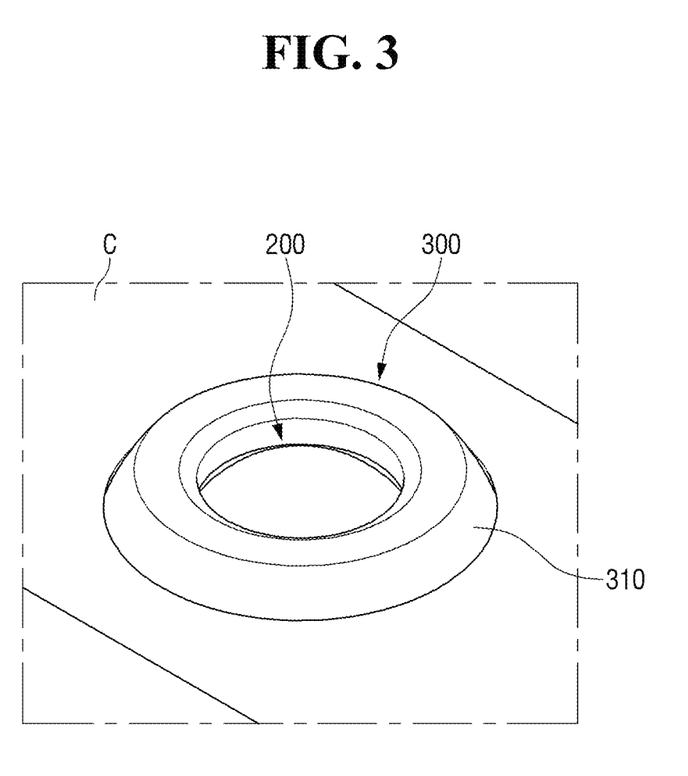

In the first state, the control unit 400 may be configured to form a lighting image for the welcoming function by the first light emitting module 210 and the second light emitting module 320 as shown in FIG. 2 described above. For example, when the ignition of the vehicle is turned on, which may indicate that the vehicle state is changed to the second state, the control unit 400 may be configured to adjust the position of the operation unit 300 from the first position to the second position so that the first surface, on which the transmission operation unit 310 is disposed, is exposed to the interior space of the vehicle as shown in FIG. 3. To this end, the control unit 400 may include a position adjusting unit 410 for adjusting the position of the operation unit 300.

Figure 4:
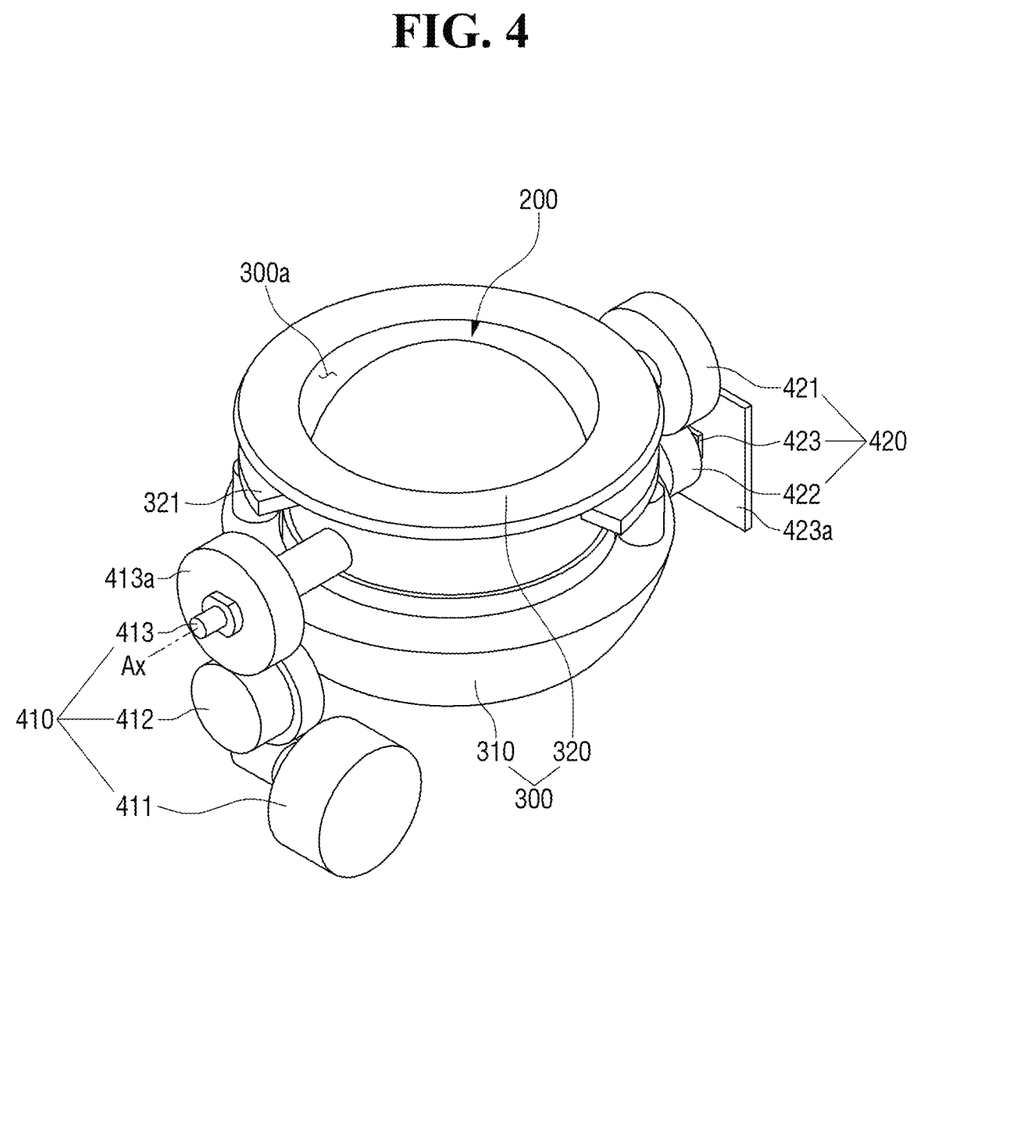
FIGS. 4 and 5 are perspective views showing an operation unit having a first position according to an embodiment of the present disclosure.
Figure 5:
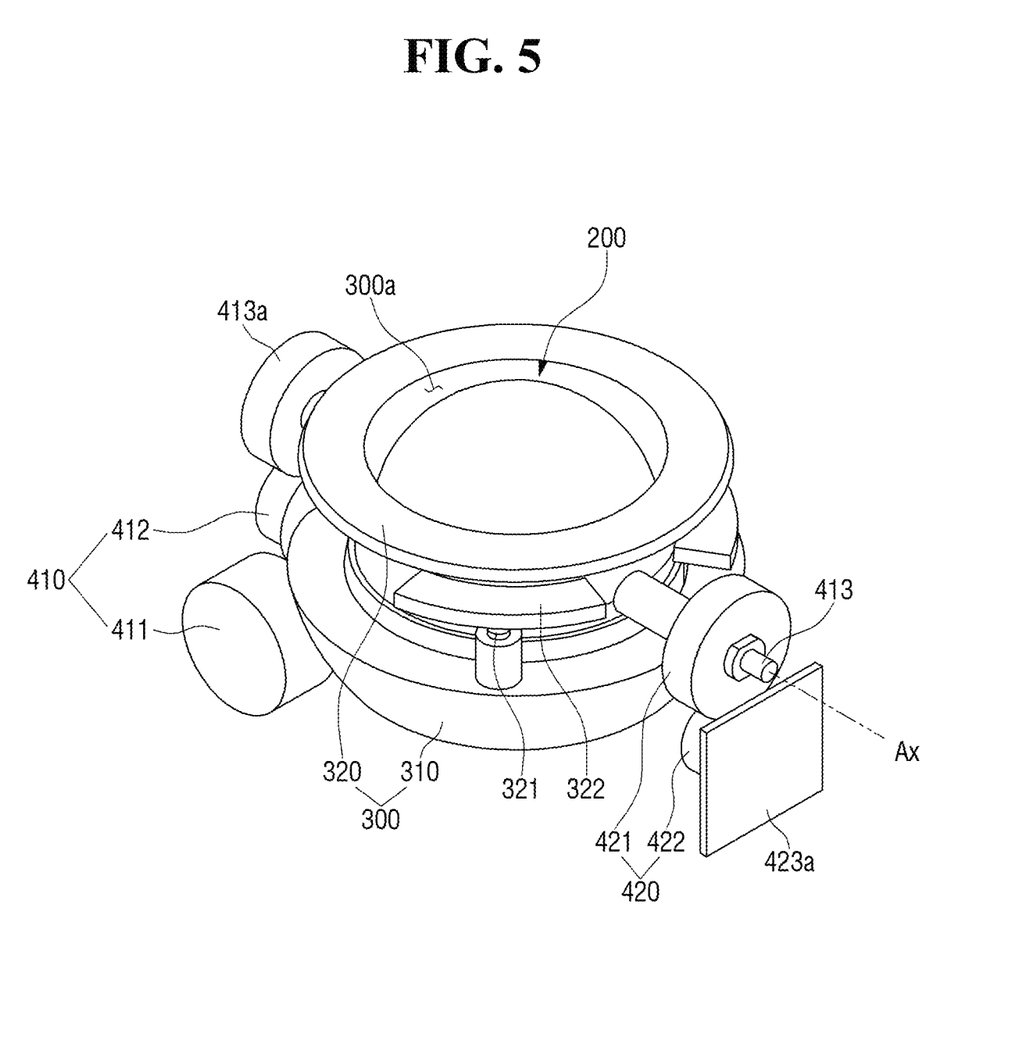
Figure 6:
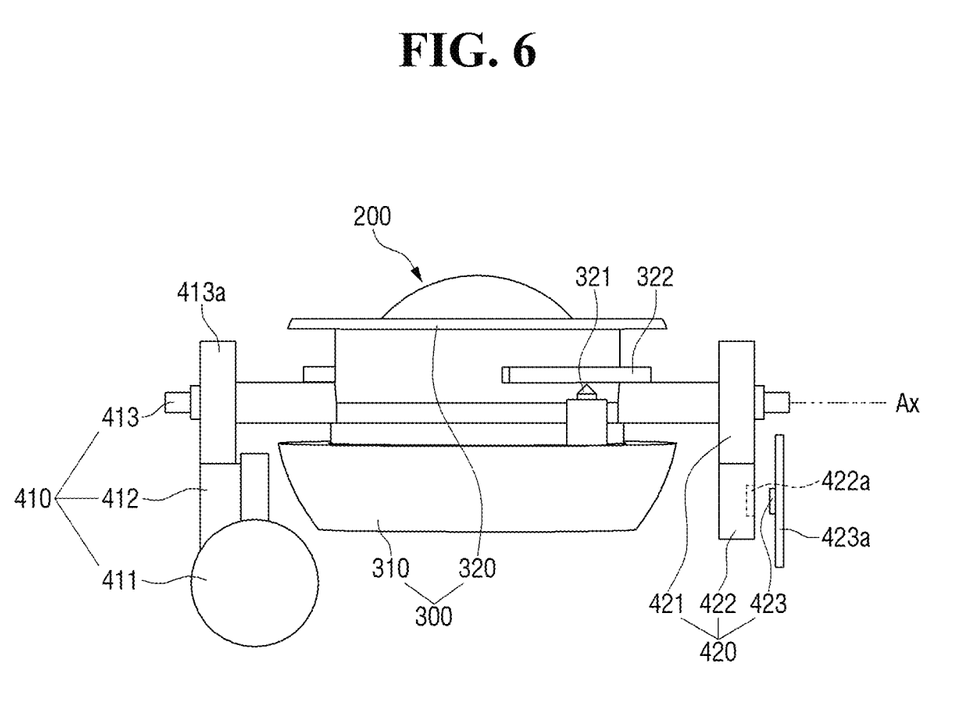
FIG. 6 is a side view showing an operation unit having a first position according to an embodiment of the present disclosure.
Figure 7:
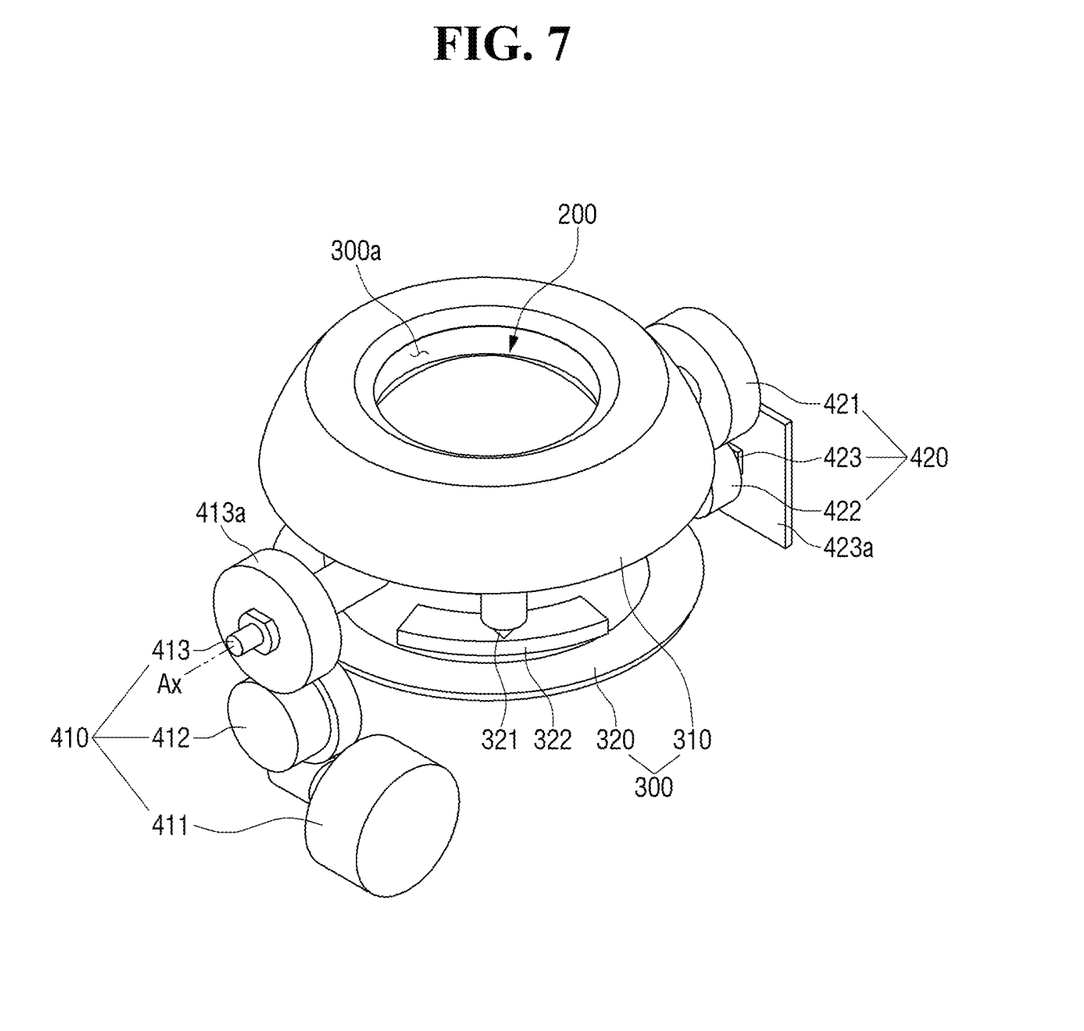
FIG. 7 is a perspective view showing an operation unit having a second position according to an embodiment of the present disclosure.
Figure 8:
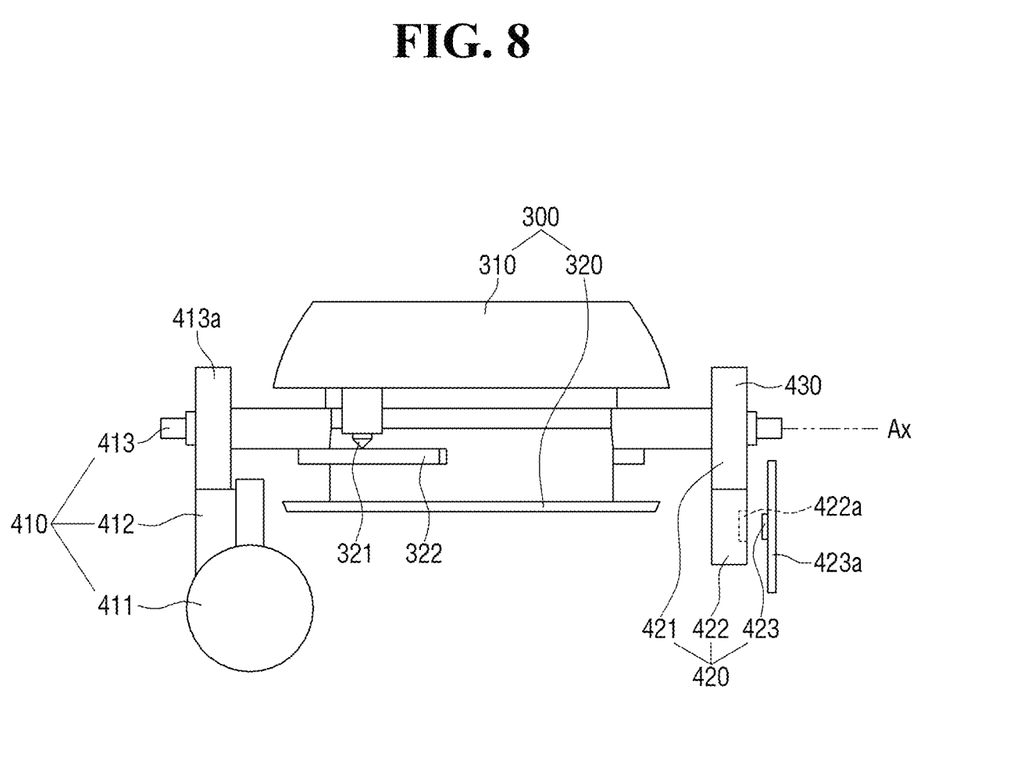
FIG. 8 is a side view showing an operation unit having a second position according to an embodiment of the present disclosure.

FIGS. 4 and 5 are perspective views illustrating the operation unit having a first position according to an embodiment of the present disclosure, and FIG. 6 is a side view showing the operation unit having a second position according to an embodiment of the present disclosure. Referring to FIGS. 4 to 6, the position adjusting unit 410 according to the embodiment of the present disclosure may include a driving unit 411 (e.g., a driver or an actuator), a driving force transfer unit 412, and a driving shaft 413.

The driving unit 411 may generate a driving force for adjusting the position of the operation unit 300, and the driving force of the driving unit 411 may be transferred to the driving gear 413a provided at one end of the driving shaft 413 coupled to the operation unit 300 via the driving force transfer unit 412, which may include at least one gear. Both ends of the driving shaft 413 may pass through the function unit 200 and may be respectively disposed on both sides of the function unit 200 so that the position of the function unit 200 may be maintained when the driving shaft 413 rotates. The driving force may be transferred via the driving force transfer unit 412 to the driving gear 413a coupled to one end of the driving shaft 413 so that the operation unit 300 may be rotated with respect to the rotation axis Ax.

In addition, a position detector 420 for detecting the position of the operation unit 300 may be provided at the other end of the driving shaft 413. The position detector 420 may include a delivering gear 421 coupled to the other end of the driving shaft 41, a magnet gear 422, on which a magnet 422a is mounted, and a sensor 423 for detecting the strength of the magnetic force by the magnet 422a. For example, the sensor 423 may include a Hall sensor installed on a substrate 423a.

When the driving shaft 413 rotates, the rotation of the driving shaft 413 may be delivered to the magnet gear 422 which meshes with the delivering gear 421 coupled to the other end of the driving shaft 413. Subsequently, the sensor 423 of the position detector 420 may detect the position of the operation unit 300 by detecting the strength of the magnetic force from the magnet 422a whose position may be changed as the magnet gear 422 is rotated.

In the embodiment of the present disclosure, an example where the strength of the magnetic force by the magnet 422a is detected to determine the position of the operation unit 300 is described. However, the present disclosure is not limited thereto, and any contact or non-contact sensor based on magnetic, electric, optical, or mechanical type detection methods may be used as the position detector 420.

FIGS. 4 to 6 show an example of the operation unit 300 having a first position, and in the case where the vehicle state detected by the vehicle state detector 100 is the second state, the operation unit 300 may be rotated around the rotation axis Ax by the position adjusting unit 410 to have a second position such that the first surface, on which the transmission operation unit 310 is disposed, may be exposed to the interior space of the vehicle. Due to this feature, the position of the operation unit 300 may be adjusted so that the transmission operation unit 310 is exposed to the interior space of the vehicle as shown in FIG. 3 from the state where the second light emitting module 320 is exposed as shown in FIG. 2.

The operation unit 300 may include an opening 300a formed to allow at least a portion of the function unit 200 to be exposed to the interior of the vehicle at the first position and the second position. The operation unit 300 may surround at least a portion of the function unit 200 due to the opening 300a. Thus, the vehicle function may be performed or the vehicle function may be controlled by the function unit 200 in the second state as well as in the first state since at least a portion of the function unit 300 can be exposed to the interior of the vehicle at the first position, at which the second light emitting module 320 is exposed to the interior of the vehicle. At the second position, the transmission operation unit 310 may be exposed.

The transmission operation unit 310 may be rotatably coupled to the second light emitting module 320, and a transmission stage may be selectable by rotating the transmission operation unit 310 while at the second position. Further, a transmission operation feeling (e.g., a haptic or tactile feedback) can be generated, as a bullet 321 formed on one of the transmission operation unit 310 or the second light emitting module 320 moves on a contact surface of a detent groove 322 formed on the other of the transmission operation unit 310 or the second light emitting module 320. In other words, the bullet 321 may be elastically supported by an elastic member (e.g., a coil spring disposed within a cavity formed in the transmission operation unit 310) along a direction in contact with the detent groove 322, and as the elastic deformation of the elastic member is changed due to the shape of the contact surface of the detent groove 322, when the transmission operation unit 310 rotates, it is possible to provide a tactile feedback to the driver.

In the embodiment of the present disclosure, an example in which the operation unit 300 rotates 180 degrees with respect to the rotation axis Ax so that the operation unit 300 is disposed at the first position or the second position is described. However, this is only an example for helping understanding of the present disclosure, and the rotation angle of the operation unit 300 may be variously determined depending on the shape of the operation unit 300, to expose the transmission operation unit 310 to the interior space of the vehicle.

In addition, in the embodiment of the present disclosure, an example in which a dial operation, by which the driver selects the transmission stage by rotating the transmission operation unit 310 is described, but the present disclosure is not limited thereto. Instead of the dial operation method, various operation methods such as a button operation method and a touch operation method including a drag and click method may be implemented by the transmission operation unit 310.

In the above-described embodiment, when the driving of the vehicle ends and the vehicle's ignition is turned off, the operation unit 300 may be rotated to the first position by the position adjusting unit 410, and the first light emitting module 210 may form a lighting image of a predetermined color, or the brightness thereof may be gradually increased or decreased, so that the driver can recognize that the ignition of the vehicle is turned off.

Figure 9:
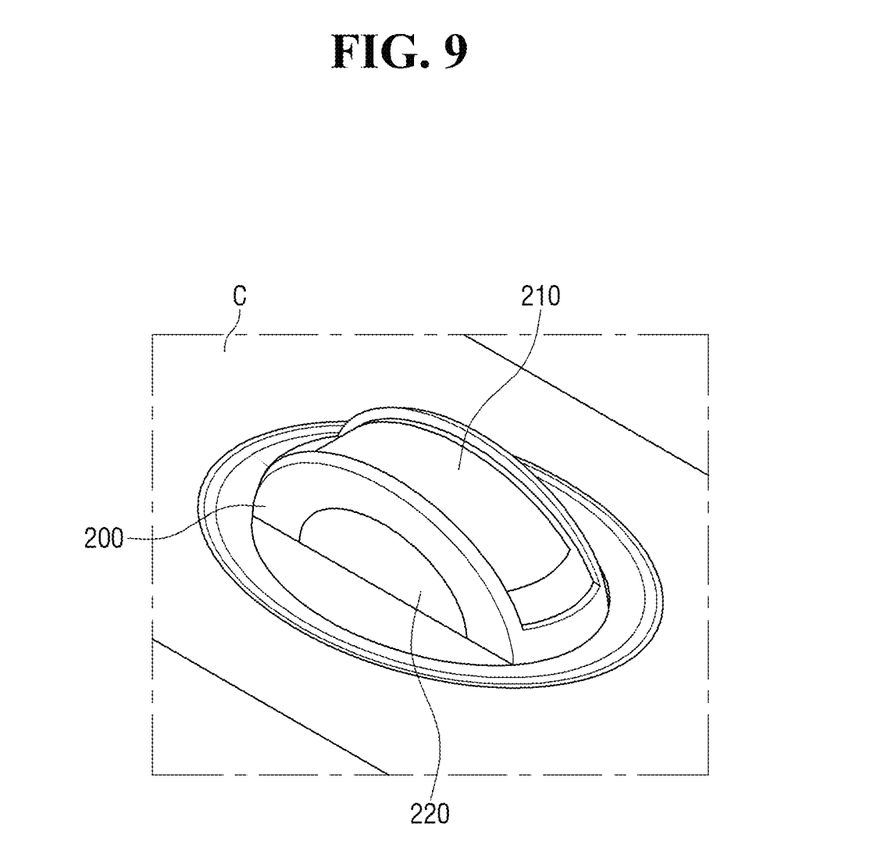
FIGS. 9 and 10 are schematic views showing a function unit and an operation unit according to another embodiment of the present disclosure.
Figure 10:
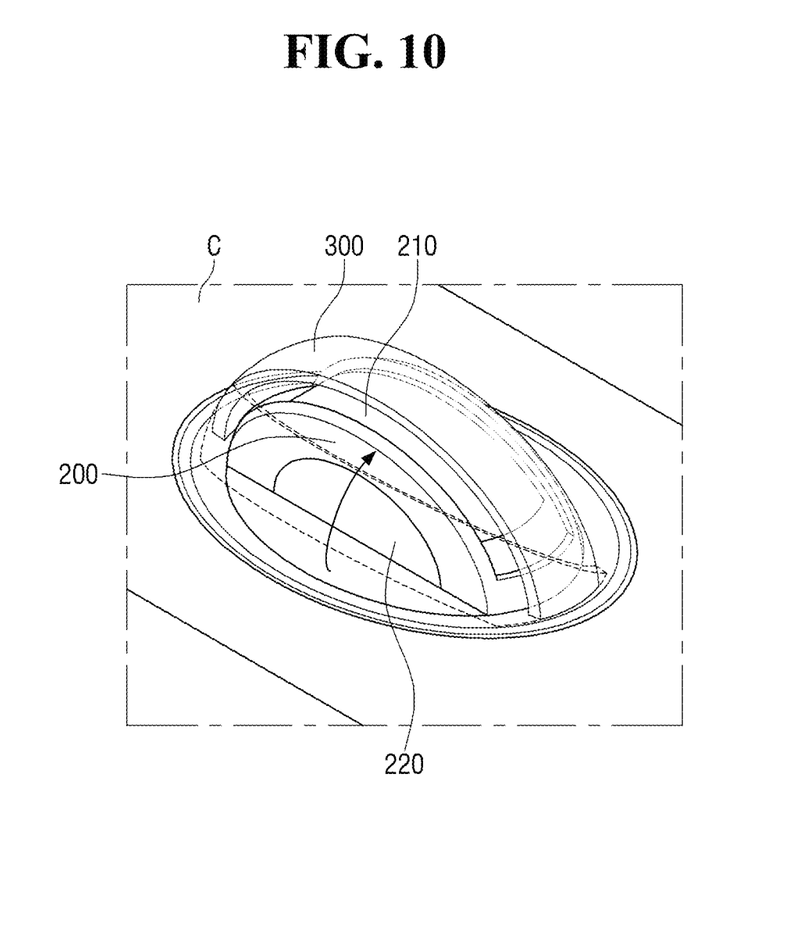

FIGS. 9 and 10 are schematic views showing a function unit and an operation unit according to another embodiment of the present disclosure. Referring to FIGS. 9 and 10, the operation unit 300 according to an embodiment of the present disclosure may be rotated by 90 degrees between a first position and a second position.

FIG. 9 shows the operation unit 300 at the first position in the first state. Also in this case, similarly to the above-described embodiment, the operation unit 300 may be disposed so that a first surface for the transmission operation is unexposed to the interior of the vehicle to prevent the driver's inadvertent operation. Further, a preset function may be performed by the function unit 200, or the driver may be allowed to input a control command for controlling at least one vehicle function via the function unit 200.

FIG. 10 shows the operation unit 300 at the second position in the second state. In this case, the operation unit 300 may be rotated by 90 degrees and disposed so that the first surface for the transmission operation is exposed to the interior of the vehicle, thereby enabling the driver's transmission operation.

In another embodiment of the present disclosure, the function unit 200 may include a transmission stage selection unit 220 for allowing the selection of a transmission stage. In this case, the driver may select some of the plurality of transmission stages using the operation unit 300, and may select other stages using the transmission stage selection unit 220. For example, the driver may select the parking (P) stage with the transmission stage selection unit 220 of the function unit 200, and may select the reverse (R), neutral (N), and drive (D) stages with the operation unit 300.

In another embodiment of the present disclosure, the function unit 200 may include a first light emitting module 210 similarly to the above-described embodiment, and the first light emitting module 210 may form a lighting image for a welcoming function in the first state, and may form a lighting image indicative of the current transmission stage in the second state.

Also, in another embodiment of the present disclosure, an operation method such as a touch operation method or a button operation method for the driver's transmission operation may be used by the operation unit 300 similar to the above-described embodiment.

In another embodiment of the present disclosure, the operation unit 300 may include a transparent or translucent material. Accordingly, the driver may more easily identify the lighting image that indicates the current transmission stage formed by the first light emitting module 210 since the transparent operation unit 300 is disposed above the function unit 200 in the second state.

In the embodiments of the present disclosure, the case where the operation unit 300 is rotated 180 degrees or 90 degrees between the first position and the second position is described as an example, but this is an example for helping understanding of the present disclosure. The present disclosure is not limited thereto, and the operation unit 300 may be linearly moved between the first position and the second position. When the position of the operation unit 300 is adjusted by linear movement, the operation unit 300 may be disposed so as not to be exposed to the interior of the vehicle in the first state, and may be raised in the second state to be exposed to the interior of the vehicle. Where the operation unit 300 linearly moves, the position adjusting unit 410 may include a rack-pinion system or a lead screw-nut structure.

As described above, in the vehicle driving control apparatus 1 of the present disclosure, the operation unit 300 may have different positions between a state that indicates that the ignition of the vehicle is turned off, and a state that indicates that the ignition of the vehicle is turned on, so that it is possible to prevent or reduce a chance for accidents against a human or a vehicle due to the driver's relative difficulty to recognize that the vehicle's ignition is turned on in an electric vehicle, as well as in an internal combustion engine vehicle.

In concluding the detailed description, those skilled in the art will appreciate that many variations and modifications can be made to the exemplary embodiments without substantially departing from the principles of the present disclosure. Therefore, the disclosed exemplary embodiments are used in a generic and descriptive sense only and not for purposes of limitation.

What is claimed is:
1. An apparatus for controlling a vehicle, comprising:
an operation unit that enables a transmission operation to allow a transmission stage to be selected from among a plurality of transmission stages;
a function unit that performs at least one vehicle function other than the transmission operation; and
a position adjusting unit that switches the operation unit between a first position where the transmission operation is disabled and a second position where the transmission operation is enabled, by rotating the operation unit with respect to the functional unit, depending on whether the vehicle is in a first state or a second state, wherein the first state includes a state in which an engine of an internal combustion engine vehicle is not running or a state in which an electric vehicle is not drivable, and the second state includes a state in which the engine of the internal combustion engine vehicle is running or a state in which the electric vehicle is drivable, wherein the function unit is configured to be activated in both the first state and the second state, and wherein at least one of the plurality of transmission stages is selectable via the function unit.

2. The apparatus of claim 1, wherein the first state includes an ignition preparation state which indicates that the ignition of the vehicle is off and the vehicle is expected to be driven.

3. The apparatus of claim 1, wherein the function unit performs a preset function depending on whether the vehicle is in the first state or the second state, and wherein the function unit is configured to receive a control command for controlling the at least one vehicle function, and to output a response corresponding to the input control command.

4. The apparatus of claim 1, wherein the function unit comprises a light emitting module for forming a lighting image having a predetermined shape, and wherein the light emitting module forms a lighting image that performs a welcoming function in the first state, and forms a lighting image that indicates a current transmission stage in the second state.

5. The apparatus of claim 1, wherein the operation unit includes a transmission operation unit on a first surface thereof for the transmission operation, and wherein the position adjusting unit adjusts a position of the operation unit to allow the first surface to be exposed to an interior space of the vehicle at the second position and to be unexposed to the interior space of the vehicle at the first position.

6. The apparatus of claim 5, wherein the position adjusting unit comprises a driving unit, and a driving force transfer unit for transferring a driving force from the driving unit to a driving shaft coupled to the operation unit.

7. The apparatus of claim 6, wherein the driving shaft is disposed to pass through the function unit to allow a position of the function unit to be maintained as the operation unit rotates.

8. The apparatus of claim 5, wherein the operation unit includes a light emitting module disposed on a second surface for forming a lighting image having a predetermined shape, and wherein the position adjusting unit adjusts a position of the operation unit to allow the second surface to be exposed to the interior space of the vehicle at the first position and to be unexposed to the interior space of the vehicle at the second position.

9. The apparatus of claim 1, further comprising:

a position detector that detects a position of the operation unit, wherein the position detector comprises a magnet whose position is changed according to a position of the operation unit, and a sensor that detects a strength of a magnetic force generated by the magnet.

10. An apparatus for controlling a vehicle, comprising:

an operation unit that enables a transmission operation to allow a transmission stage to be selected from among a plurality of transmission stages;

a function unit that performs at least one vehicle function other than the transmission operation; and a position adjusting unit that switches the operation unit between a first position where the transmission operation is disabled and a second position where the transmission operation is enabled, by rotating the operation unit with respect to the functional unit, depending on whether the vehicle is in a first state or a second state, wherein the first state includes a state in which an engine of an internal combustion engine vehicle is not running or a state in which an electric vehicle is not drivable, and the second state includes a state in which the engine of the internal combustion engine vehicle is running or a state in which the electric vehicle is drivable, wherein the function unit is configured to be activated in both the first state and the second state, and wherein the operation unit is configured to be operated by a dial operation method.

11. An apparatus for controlling a vehicle, comprising:

an operation unit that enables a transmission operation to allow a transmission stage to be selected from among a plurality of transmission stages;

a function unit that performs at least one vehicle function other than the transmission operation; and a position adjusting unit that switches the operation unit between a first position where the transmission operation is disabled and a second position where the transmission operation is enabled, by rotating the operation unit with respect to the functional unit, depending on whether the vehicle is in a first state or a second state, wherein the first state includes a state in which an engine of an internal combustion engine vehicle is not running or a state in which an electric vehicle is not drivable, and the second state includes a state in which the engine of the internal combustion engine vehicle is running or a state in which the electric vehicle is drivable, wherein the function unit is configured to be activated in both the first state and the second state, wherein the operation unit includes an opening that surrounds at least a portion of the function unit, and wherein the opening exposes at least a portion of the function unit to an interior space of the vehicle when the operation unit is at the first position and the second position.

12. A method for controlling a vehicle, comprising:

detecting whether the vehicle is in a first state or a second state, wherein the first state includes a state in which an engine of an internal combustion engine vehicle is not running or a state in which an electric vehicle is not drivable, and the second state includes a state in which the engine of the internal combustion engine vehicle is running or a state in which the electric vehicle is drivable;

adjusting a position of an operation unit that enables a driver's transmission operation so as to be disposed between a first position, in which the transmission operation is disabled, and a second position, in which the transmission operation is enabled, by rotating the operation unit depending on whether the vehicle is in the first state or the second state with respect to a function unit that performs at least one vehicle function other than the transmission operation, wherein, in the first state, the position of the operation unit is adjusted to allow a first surface, on which a transmission operation unit is disposed, to be unexposed to a cabin of the vehicle and to allow a second surface, on which the function unit is disposed, to be exposed to the cabin, and wherein, in the second state, the position of the operation unit is adjusted to allow the surface to be exposed to the cabin and to allow the second surface to be unexposed to the cabin.

13. The method of claim 12, further comprising:
  forming a lighting image having a predetermined shape using a light emitting module provided in the function unit depending on whether the operation unit is disposed at the first position or the second position.

14. The method of claim 13, wherein the forming the lighting image comprises:
  forming a lighting image that performs a welcoming function by the light emitting module in the first state; and
  forming a lighting image that indicates a current transmission stage in the second state.

* * * * *